United States Patent [19]
Brown

[11] Patent Number: 4,828,467
[45] Date of Patent: May 9, 1989

[54] SUPERCHARGER AND ROTOR AND SHAFT ARRANGEMENT THEREFOR

[75] Inventor: Richard J. Brown, Marshall, Mich.

[73] Assignee: Eaton Corporation, Cleveland, Ohio

[21] Appl. No.: 145,017

[22] Filed: Jan. 19, 1988

[51] Int. Cl.⁴ .................. F04C 18/18; F04C 29/00; F16B 4/00; F16D 1/00

[52] U.S. Cl. .................. 418/201 R; 418/206; 418/270; 29/156.4 R; 29/525; 403/282; 403/345

[58] Field of Search .............. 418/201, 206, 270; 29/156.4 R, 525; 403/273, 282, 345, 359, 375

[56] References Cited

U.S. PATENT DOCUMENTS

| | | | |
|---|---|---|---|
| 2,372,485 | 3/1945 | Griffin | 403/345 |
| 3,074,292 | 1/1963 | Polmon | 29/525 |
| 4,269,550 | 5/1981 | DiGiulio | 29/525 |
| 4,595,349 | 6/1986 | Preston et al. | 418/206 |
| 4,747,763 | 5/1988 | Sibata et al. | 403/282 |

Primary Examiner—John J. Vrablik
Attorney, Agent, or Firm—L. J. Kasper

[57] ABSTRACT

A Roots-type blower or supercharger (11) is provided of the type including a pair of meshed, lobed rotors (21) and (23) which are press-fit onto a pair of shafts (25) and (27), respectively. Each of the rotors includes a first bore portion (65), and a second bore portion (69), while the shaft defines a first shaft portion (67), press-fit into the first bore portion, and a second shaft portion (71), press-fit into the second bore portion. The shaft defines a close-clearance land (63), disposed forwardly of the first shaft portion. Disposed between the close-clearance land and the first shaft portion is an entrapment groove (75) which is sized so that it can contain all of the material sheared from the surface of the first bore portion (65) during the press-fit operation. The close-clearance land (63) cooperates with the first bore portion to define a close-clearance, able to retain the sheared material within the entrapment groove, and not permit it to pass forwardly, or be outside of the rotor/shaft subassembly.

3 Claims, 2 Drawing Sheets

SUPERCHARGER AND ROTOR AND SHAFT ARRANGEMENT THEREFOR

BACKGROUND OF THE DISCLOSURE

The present invention relates to rotary compressors or blowers, particularly to blowers of the Roots type. More particularly, the present invention relates to blowers of the type having rotors press-fit on shafts for rotation therewith.

Although the present invention may be used with various types of blowers, it is especially advantageous when used with a Roots type blower, and will be described in connection therewith.

Rotary blowers of the Roots type typically include a pair of meshed, lobed rotors, with each of the rotors being mounted on a shaft, and each shaft having mounted thereon a timing gear. Rotary blowers, particularly Roots-type blowers, which are employed as superchargers for internal combustion engines normally operate at relatively high speeds, typically in the range of 10,000 to 20,000 rpm.

As is well known to those skilled in the art, it is essential that the rotors mesh with each other, to transfer volumes of air from the inlet port to the outlet port, without the rotors actually touching each other. Therefore, the connection between each rotor and its shaft must be such that there is no relative rotation possible between the rotor and its shaft. In addition, transferring volumes of air at greater than atmospheric pressure requires that the mounting of the rotor on its shaft be able to transmit a certain amount of torque.

A typical prior art arrangement for mounting an aluminum rotor on a steel shaft is illustrated and described in U.S. Pat. No. 4,595,349, assigned to the assignee of the present invention, and incorporated herein by reference. In the cited patent, the steel shaft includes two different press-fit diameters, as well as a set of external splines which, during the press-fit operation, deform the mating surface of the bore of the rotor, thus providing a torque-transmitting connection between the shaft and the rotor.

It has been found that, because of the different coefficients of thermal expansion of steel and aluminum, it is necessary to provide a greater amount of interference between the shaft and the bore surface before the press-fit is performed. The result is that there is still a sufficient interference fit while the supercharger is operating at temperatures much higher than those at which the press-fit was performed. However, a problem associated with the greater amount of interference, and the heavier press-fit required, is a certain amount of "shearing-off" of aluminum from the rotor bore surface during the press-fit, the aluminum being sheared off in the form of either rings or chips. Those that are loose do not present a serious problem, but those that cannot be removed by conventional deburring methods are very undesirable. Complete removal of such material would require expensive, extra processing, but the failure to completely remove such material could potentially result in serious damage to the supercharger, if the material subsequently becomes loose during operation.

SUMMARY OF THE INVENTION

Accordingly, it is an object of the present invention to provide an improved blower of the type having the rotors press-fit onto shafts, wherein the press-fit operation does not result in metal rings or chips, external to the rotor at the end of the bore, which either requires expensive removal, or could subsequently come loose within the unit.

It is a related object of the present invention to provide an improved blower which accomplishes the above-stated object, and wherein the shaft includes and arrangement for storing such removed metal rings and chips, in a storage or entrapment region between the rotor and the shaft.

The above and other objects of the present invention are accomplished by the provision of an improved blower of the type including a pair of meshed, lobed rotors mounted for rotation within a housing. A stepped bore extends through at least one of the rotors, the stepped bore being defined by a plurality of axially-spaced bore portions, concentric to the rotational axis of the rotor, the plurality of bore portions having different diameters. A shaft is provided for supporting each of the rotors, at least one of the shafts being a stepped shaft, defined by a plurality of axially-spaced shaft portions, concentric to the rotational axis of the shaft. The shaft portions have sufficiently different diameters with respect to each other, and with respect to the bore portions, to form axially-spaced apart first and second interference fits with at least two of the bore portions when the shaft is pressed into the stepped bore. One of the plurality of shaft portions includes a set of circumferentially-spaced splines formed of a material operable to deform the surface of one of the plurality of bore portions, and thereby form mating splines therein when the shaft is pressed into the stepped bore. The improved blower is characterized by the stepped shaft defining a forward portion with respect to the direction of movement of the shaft as it is pressed into the stepped bore, and one of the interference fits being disposed adjacent the forward portion of the stepped shaft. The forward portion of the shaft defines a close-clearance land, the land defining a close-clearance with respect to the adjacent bore portion. The forward portion of the stepped shaft further defines a generally annular entrapment region, disposed axially between the close-clearance land and one of the interference fits, the entrapment region being sized to receive and store material removed from the bore portion of said one of the interference fits as the stepped shaft is pressed into the bore. The close-clearance defined by the close-clearance land is sized substantially to prevent the passage of the removed material from the entrapment region past the close-clearance land.

DESCRIPTION OF THE PREFERRED EMBODIMENT

Figure 1:
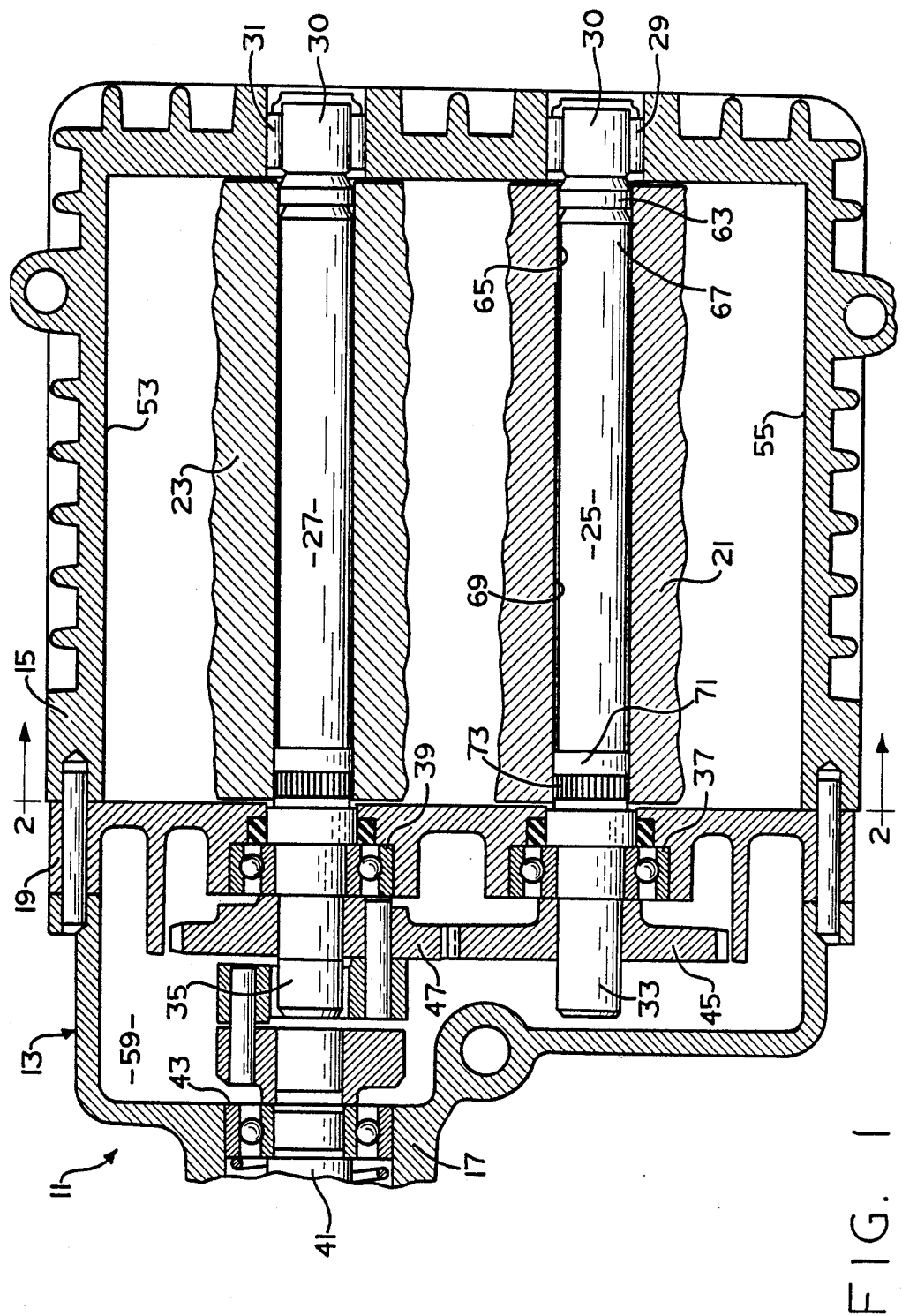
FIG. 1 is a horizontal cross-sectional view of the blower, talen on line 1—1 of FIG. 2, with only a fragmental portion of each of the rotors shown.

Referring now to the drawings, which are not intended to limit the invention, FIG. 1 illustrates a Roots-type blower or supercharger 11, of the type which is illustrated and described in greater detail in U.S. Pat.

No. 4,595,349, already incorporated herein by reference. The blower 11 includes a housing assembly, generally designated 13, which comprises a rotor housing section 15, a gear housing section 17, and a bearing housing 19, which is disposed between the sections 15 and 17.

A pair of rotors 21 and 23 are mounted on parallel shafts 25 and 27, with the shafts 25 and 27 being rotatably supported within the rotor housing section 15 by means of bearing sets 29 and 31, respectively. The forward end (right end in FIGS. 1 & 3) of each of the shafts 25 and 27 comprises a ground bearing seat 30, on which is seated the bearing sets 29 or 31. The rotors 21 and 23 will be described in greater detail subsequently in connection with the description of FIG. 2.

The shafts 25 and 27 include shaft extensions 33 and 35, respectively, which extend through openings in the bearing housing section 19, and are rotatably supported therein by means of bearing sets 37 and 39.

Those elements described thus far are generally the same (i.e., the rotor 21 is identical to the rotor 23), except that the shaft extension 35 has connected thereto an input shaft portion 41 which extends through the gear housing section 17, and is rotatably supported therein by means of a bearing set 43. Secured to the shaft extension 33 is a timing gear 45, and secured to the shaft extension 35 is a timing gear 47. The input shaft Portion 41, shaft extension 35, and timing gear 47 are the driving elements, whereas the timing gear 45, and shaft extension 33 are the driven elements, as is well understood by those skilled in the art.

Figure 2:
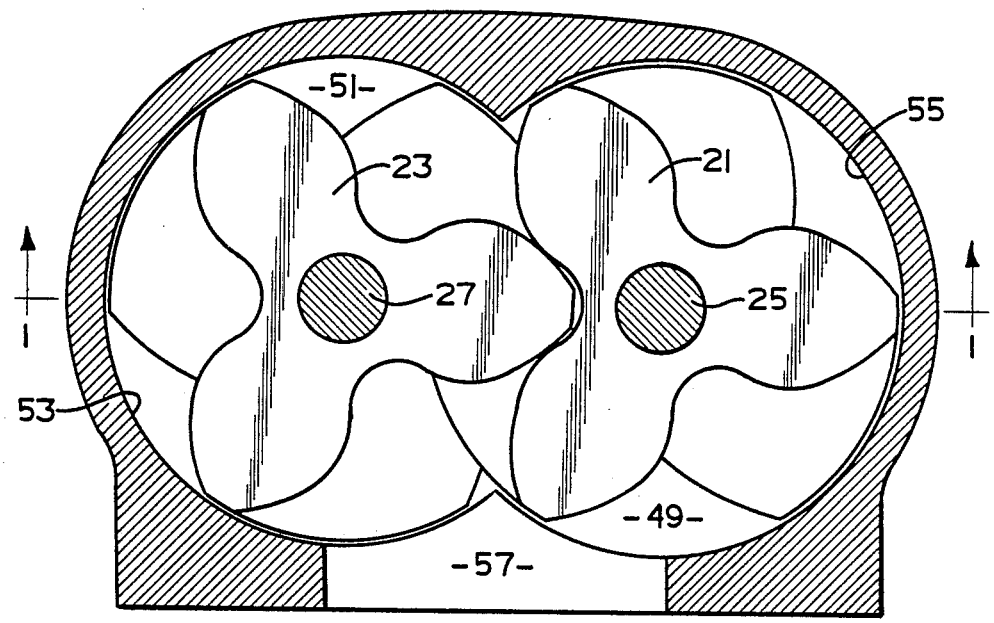
FIG. 2 is a transverse cross-sectional view of the rotors and shafts, taken on line 2—2 of FIG. 1.

Referring now to FIG. 2, in conjunction with FIG. 1, the housing sections 15, 17, and 19 are preferably cast from a lightweight metal such as aluminum. The rotor housing section 15 defines a pair of generally cylindrical working chambers 49 and 51, defined by the cylindrical inner surfaces 53 and 55, respectively, of the rotor housing section 15. The chambers 49 and 51 transversely overlap each other, thus resulting in the meshing of the lobed rotors 21 and 23, as shown in FIG. 2. The rotor housing section 15 also defines an inlet fluid port (not shown in the drawings), and an outlet fluid port 57, through which a compressible fluid, such as air, may be communicated from the blower 11 to the intake portion of an internal combustion engine.

The rotors 21 and 23 are preferably formed of a lightweight material such as aluminum, and are shown only fragmentally in FIG. 1, but in axial plan view in FIG. 2. Each rotor includes three helical teeth or lobes of modified involute profile, as best shown in FIG. 2. The construction details of the rotors 21 and 23 are explained in great detail in above-incorporated U.S. Pat. No. 4,595,349, and because such construction details do not form an essential part of the present invention, they will not be described in greater detail herein It will be understood however by those skilled in the art that the present invention is not limited to any particular rotor configuration, but instead, may be utilized with any type of rotor which needs to be press-fit onto its shaft, especially where a fairly heavy press-fit is required.

As was generally mentioned in the background of the present specification, the meshing lobes of the rotors 21 and 23 should never touch each other. In addition, the outer periphery of the lobes, as well as the end faces of the rotors, should never touch the cylindrical surfaces 53 and 55, or the axial end surfaces of the working chambers 49 and 51. However, to prevent unacceptable internal leakage, any clearance provided to prevent such touching should be held to an absolute minimum. In order to maintain all of the above-described relationships, it is essential that the axial and rotational positions of each of the rotors 21 and 23, relative to its shaft 25 or 27, should remain fixed. Such a fixed relationship between the rotors and their respective shafts has typically been achieved by pressing the rotor onto the shaft with sufficient force that the required torque may be transmitted from the shaft to the rotor, without relative axial or rotational movement therebetween.

As is well known to those skilled in the art, the gear housing section 17 and bearing housing section 19 cooperate to define a gear chamber 59, in which the timing gears 45 and 47 are disposed. One function of the gear chamber 59 is to contain a quantity of lubrication fluid, which typically may be any one of a number of suitable lubrication oils. As is also well known to those skilled in the art, the timing gear 47 drives the timing gear 45, and thus, there is actual sliding engagement between the gear teeth of the timing gears, unlike the rotors 21 and 23 which, as mentioned previously, do not actually touch each other.

Figure 3:
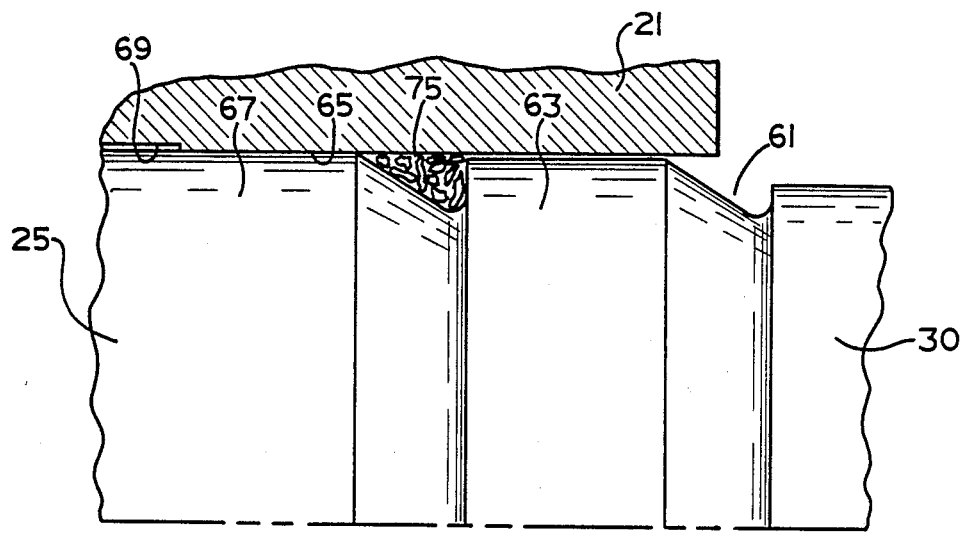
FIG. 3 is a fragmentary view, similar to FIG. 1, but on a much larger scale, showing the forward portion of the shaft and the mating portion of the rotor, made in accordance with the present invention.

Referring now primarily to FIG. 3, in conjunction with FIG. 1, the present invention provides an improved shaft and rotor arrangement which eliminates the problem relating to the aluminum material removed from the bore of the rotor during the press-fit operation. As may best be seen in FIG. 3, adjacent the bearing seat 30, the forward portion of the shaft 21 defines an undercut portion 61 which is included only to facilitate the grinding of the bearing seat 30. It should be clearly understood that the present invention does not require the presence of the undercut portion 61, or any particular configuration thereof.

Disposed axially adjacent the undercut portion 61 is a close-clearance land 63, the function of which will be described subsequently, in connection with the press-fit of the shaft 25 into the rotor 21. The rotor 21 defines a first bore portion 65, and the close-clearance land 63 and the bore portion 65 cooperate to define a close-clearance, i.e., a clearance which is relatively small in the radial direction. Those skilled in the art will understand what is meant by a close-clearance from a reading and understanding of the remainder of the specification.

Disposed axially somewhat to the left of the close-clearance land 63, the shaft 25 defines a first shaft portion 67 having a diameter which cooperates with the bore portion 65 to provide a first interference fit. Similarly, as may be seen by referring again to FIG. 1, the rotor 21 defines a second bore portion 69, and the shaft 25 defines a second shaft portion 71, having a diameter which cooperates with the second bore portion 69 to provide a second interference fit.

Disposed axially to the left of the second interference fit, the shaft 25 defines a set of circumferentially disposed splines or serrations 73, which, during the press-fit operation, are operable to deform the bore surface of the rotor 21, such that the adjacent surface of the rotor defines mating splines or serrations. It should be understood by those skilled in the art that the present invention is not limited to any particular configuration of the splines 73, such that the term "splines", as used hereinafter, may include splines of the type shown, or serrations, or some sort of knurl, etc. The general arrangement of two interference fits, plus a set of mating splines, is well known in the art, and is described in above-incorporated U.S. Pat. No. 4,595,349.

Referring again primarily to FIG. 3, disposed axially between the close-clearance land 63 and the first shaft portion 67 is an entrapment groove 75, which is illustrated in FIG. 3 as approximately the same size and configuration as the undercut portion 61, although it should be understood that such a relationship is not significant to the present invention.

During the press-fit operation, the first shaft portion 67 is pressed into the first bore portion 65, while the second shaft portion 71 is being pressed into the second bore portion 69, and also at the same time, the splines 73 are deforming the mating bore surface. As the first shaft portion 67 is pressed into the first bore portion 65, the forward edge of the shaft portion 67 will shear-off some of the aluminum from the bore portion 65, as was described in the background of the present specification. The sheared-off aluminum material removed from the rotor bore is forced forwardly (to the right in FIG. 3), as the shaft 25 is pressed further into the rotor 21, and the aluminum material is trapped in the entrapment groove 75. It should now be understood by those skilled in the art that the entrapment groove 75 should be sized so that it can easily contain all of the aluminum material sheared from the bore surface during the press-fit operation.

The function of the close-clearance land 63, and the close-clearance it defines, is to retain the sheared aluminum material within the entrapment groove 75, and not permit it to pass forwardly through the clearance defined between the land 63 and the surface of the first bore portion 65. Retaining the removed material within the groove 75 is an essential feature of the present invention because, as discussed in the background of the specification, if any of the removed material subsequently becomes loose, the result could be serious damage to the supercharger. For example, without the close-clearance, some of the removed material could pass from between the shaft and the rotor and eventually get between the lobes of the rotors 21 and 23, which would cause substantial damage to the rotors, as well as an excessive amount of noise.

Therefore, the present invention provides an improved blower, and an improved rotor and shaft arrangement therefor, such that the shaft may be pressed into the rotor, and the material which is sheared off from the rotor bore will be trapped or stored in an entrapment groove. As a result, no subsequent deburring processes will be required, and there will be no removed material external to the rotor/shaft subassembly, which could cause damage to the blower.

The invention has been described in great detail sufficient to enable one skilled in the art to make and use the same. Various alterations and modifications of the invention will become apparent to those skilled in the art upon a reading and understanding of the foregoing specification. It is intended that the present invention includes all such alterations and modifications, insofar as they come within the scope of the appended claims.

I claim:

1. In a rotary blower of the type including a pair of meshed, lobed rotors mounted for rotation within a housing; a stepped bore extending through at least one of said rotors, said stepped bore defined by a plurality of axially spaced bore portions, concentric to the rotational axis of the rotor, said plurality of axially spaced bore portions having different diameters; a shaft for supporting each of said rotors, at least one of said shafts being a stepped shaft, defined by a plurality of axially spaced shaft portions, concentric to the rotational axis of the shaft, said shaft portions having sufficiently different diameters with respect to each other, and with respect to said bore portions, to form axially spaced apart first and second interference fits with at least two of said bore portions when said shaft is pressed into said stepped bore; one of said plurality of shaft portions including a set of circumferentially spaced splines formed of a material operable to deform the surface of one of said plurality of bore portions, and thereby form mating splines in said one of said plurality of bore portions when said shaft is pressed into said stepped bore; characterized by:
    (a) said stepped shaft defining a forward portion with respect to the direction of movement of said shaft as it is pressed into said stepped bore;
    (b) one of said interference fits being disposed adjacent said forward portion of said stepped shaft;
    (c) said forward portion of said shaft defining a close-clearance land, said land defining a close-clearance with respect to the adjacent bore portion;
    (d) said forward portion of said stepped shaft further defining a generally annular entrapment region, disposed axially between said close-clearance land and said one of said interference fits, said entrapment region being sized to receive and store material removed from the bore portion of said one of said interference fits as said stepped shaft is pressed into said bore; and
    (e) said close-clearance defined by said close-clearance land is sized substantially to prevent the passage of said removed material from said entrapment region past said close-clearance land.

2. In a rotary blower of the type including a pair of meshed, lobed rotors mounted for rotation within a housing; a stepped bore extending through at least one of said rotors, said stepped bore defined by a plurality of axially spaced bore portions, concentric to the rotational axis of the rotor, said plurality of axially spaced bore portions having different diameters; a shaft for supporting each of said rotors, at least one of said shafts being a stepped shaft, defined by a plurality of axially spaced shaft portions, concentric to the rotational axis of the shaft, said shaft portions having sufficiently different diameters with respect to each other, and with respect to said bore portions, to form axially spaced apart first and second interference fits with at least two of said bore portions when said shaft is pressed into said stepped bore; characterized by:
    (a) said stepped shaft defining a forward portion with respect to the direction of movement of said shaft as it is pressed into said stepped bore;
    (b) one of said interference fits being disposed adjacent said forward portion of said stepped shaft;
    (c) said forward portion of said shaft defining a close-clearance land, said land defining a close-clearance with respect to the adjacent bore portion;
    (d) said forward portion of said stepped shaft further defining a generally annular entrapment region, disposed axially between said close-clearance land and said one of said interference fits, said entrapment region being sized to receive and store material removed from the bore portion of said one of said interference fits as said stepped shaft is pressed into said bore; and
    (e) said close-clearance defined by said close-clearance land is sized substantially to prevent the passage of said removed material from said entrapment region past said close-clearance land.

3. In a rotary blower of the type including a pair of meshed, lobed rotors mounted for rotation within a housing; a stepped bore extending through at least one of said rotors, said stepped bore defined by a plurality of axially spaced bore portions, concentric to the rotational axis of the rotor, said plurality of axially spaced bore portions having different diameters; a shaft for supporting each of said rotors, at least one of said shafts being a stepped shaft, defined by a plurality of axially spaced shaft portions, concentric to the rotational axis of the shaft, said shaft portion having sufficiently different diameters with respect to each other, and with respect to said bore portions, to form at least one interference fit with one of said bore portions when said shaft is pressed into said stepped bore; one of said plurality of shaft portions including a set of circumferentially spaced splines formed of a material operable to deform the surface of one of said plurality of bore portions, and thereby form mating splines in said one of said plurality of bore portions when said shaft is pressed into said stepped bore; characterized by:
 (a) said stepped shaft defining a forward portion with respect to the direction of movement of said shaft as it is pressed into said stepped bore;
 (b) said interference fit being disposed adjacent said forward portion of said stepped shaft;
 (c) said forward portion of said shaft defining a close-clearance land, said land defining a close-clearance with respect to the adjacent bore portion;
 (d) said forward portion of said stepped shaft further defining a generally annular entrapment region, disposed axially between said close-clearance land and said interference fit, said entrapment region being sized to receive and store material removed from the bore portion of said interference fit as said stepped shaft is pressed into said bore; and
 (e) said close-clearance defined by said close-clearance land is sized substantially to prevent the passage of said removed material from said entrapment region past said close-clearance land.

* * * * *